(12) United States Patent
Ono et al.

(10) Patent No.: US 10,845,001 B2
(45) Date of Patent: Nov. 24, 2020

(54) FLUID PRESSURE LOOP

(71) Applicant: Honda Motor Co., Ltd., Tokyo (JP)

(72) Inventors: Yuki Ono, Saitama (JP); Yuji Koga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 15/919,226

(22) Filed: Mar. 13, 2018

(65) Prior Publication Data
US 2018/0274724 A1  Sep. 27, 2018

(30) Foreign Application Priority Data

Mar. 22, 2017 (JP) ................. 2017-055865

(51) Int. Cl.
| | |
|---|---|
| F16N 25/02 | (2006.01) |
| F16H 57/04 | (2010.01) |
| F01M 1/16 | (2006.01) |
| F16N 13/20 | (2006.01) |
| F16N 7/38 | (2006.01) |

(52) U.S. Cl.
CPC ............... *F16N 25/02* (2013.01); *F01M 1/16* (2013.01); *F16H 57/0435* (2013.01); *F16N 7/38* (2013.01); *F16N 7/385* (2013.01); *F16N 13/20* (2013.01); *F16N 2210/04* (2013.01); *F16N 2280/00* (2013.01)

(58) Field of Classification Search
CPC ...... F16N 25/02; F16N 27/00; F16H 57/0435; F16H 61/4017; F16H 61/4043; F01M 1/16
See application file for complete search history.

(56) References Cited

U.S. PATENT DOCUMENTS 3,507,298 A * 4/1970 Ratliff ................. F16H 61/4043
                                                    137/106
7,311,187 B2 * 12/2007 Koenig ................. F16D 25/123
                                                    192/113.3
(Continued)

FOREIGN PATENT DOCUMENTS

| CN | 1734127 | 2/2006 |
|---|---|---|
| CN | 103591281 | 2/2014 |

(Continued)

OTHER PUBLICATIONS

"Office Action of China Counterpart Application", dated Jul. 28, 2020, with English translation thereof, pp. 1-9.

*Primary Examiner* — Minh Truong
(74) *Attorney, Agent, or Firm* — JCIPRNET (57) ABSTRACT

A lubrication loop includes a main flow path connected to a lubrication flow path, a control valve connected to the main flow path, a return flow path connected to the control valve and configured to return the fluid to the fluid pump, and a sub-flow path branching off from the main flow path. The control valve includes a discharge port at a distance from a supply port of a valve housing chamber and connected to the return flow path, an open port formed at one end of the valve housing chamber to discharge the fluid, an annular recessed portion formed on an outer circumferential surface of the spool has a width extending from the supply port to the discharge port, and a sub port annularly formed between the discharge port and the open port on an inner circumferential surface of the valve housing chamber and connected to the sub-flow path.

3 Claims, 6 Drawing Sheets

(56) References Cited

U.S. PATENT DOCUMENTS

| | | | | |
|---|---|---|---|---|
| 8,443,956 | B2* | 5/2013 | Bauer | F16D 25/123 |
| | | | | 192/85.61 |
| 10,508,730 | B2 | 12/2019 | Buchmann et al. | |
| 2002/0079002 | A1* | 6/2002 | Ueki | F16K 11/0716 |
| | | | | 137/625.3 |
| 2009/0071545 | A1* | 3/2009 | Xiang | F16H 61/0276 |
| | | | | 137/118.02 |
| 2015/0316149 | A1* | 11/2015 | Van Wijk | F16H 57/0435 |
| | | | | 474/28 |
| 2016/0290496 | A1* | 10/2016 | Tsuchida | F16H 57/0441 |
| 2017/0044939 | A1* | 2/2017 | Watanabe | F16K 17/065 |

FOREIGN PATENT DOCUMENTS

| | | |
|---|---|---|
| DE | 102005029964 | 3/2007 |
| JP | 2015200369 | 11/2015 |

\* cited by examiner

FLUID PRESSURE LOOP

CROSS-REFERENCE TO RELATED APPLICATION

This application claims the priority benefit of Japan application serial no. 2017-055865, filed on Mar. 22, 2017. The entirety of the above-mentioned patent application is hereby incorporated by reference herein and made a part of this specification.

BACKGROUND

Technical Field

The disclosure relates to a fluid pressure loop including a lubrication loop and a fluid pump for feeding a fluid to the lubrication loop.

Description of Related Art

Conventionally, a fluid pressure loop for controlling an automatic transmission with a fluid pressure supplied from a fluid pump is known (for example, see Patent Document 1). The automatic transmission of Patent Document 1 is a belt type stepless transmission, and the fluid pressure loop includes an operation system loop formed with pulleys and a lubrication system loop that supplies a fluid to parts of the stepless transmission for lubricating or cooling them.

[Patent Document 1] Japanese Unexamined Patent Application, First Publication No. 2015-200369

In a fluid pressure loop, a fluid fed from a fluid pump to a flow path by a driving force of an engine is sent to a lubrication system loop (hereinafter referred to as a lubrication loop) via a pressure control valve controlled by a fluid pressure. Generally, in order to adjust a flow rate of a fluid flowing through a lubrication loop, it is conceivable to provide a flow rate control mechanism which controls the fluid in the lubrication loop such that it is released when the flow rate in the lubrication loop increases. However, even when the flow rate control mechanism for controlling the flow rate in the lubrication loop is provided, a state of the fluid may not be satisfactorily maintained in some cases.

SUMMARY

The disclosure has been made in view of the above-described points, and the disclosure provides a fluid pressure loop capable of adjusting a flow rate of a fluid flowing through a lubrication loop and maintaining a state of the fluid satisfactorily.

[1] The disclosure provides a fluid pressure loop (for example, a fluid pressure loop 1 of the embodiment; the same applies below) including an operation loop (for example, an operation loop 3 of the embodiment; the same applies below) which supplies a fluid (for example, a lubricating oil of the embodiment; the same applies below) to an operating portion (for example, an operating portion 2 of the embodiment; the same applies below), a lubrication loop (for example, a lubrication loop 5 of the embodiment; the same applies below) which supplies a fluid to a lubricating portion (for example, a lubricating portion 4 of the embodiment; the same applies below), a fluid pump (for example, a hydraulic pump 6; the same applies below) which feeds the fluid, and a first control valve (for example, a first control valve 7 of the embodiment; the same applies below) which controls a fluid pressure of the operation loop by controlling a flow rate of the fluid from the fluid pump to the lubrication loop, in which the lubrication loop includes a lubrication flow path which introduces the fluid from the first control valve, a main flow path (for example, a main flow path L6 of the embodiment; the same applies below) connected to the lubrication flow path and configured to release the fluid, a second control valve (for example, a second control valve 11 of the embodiment; The same applied below.) connected to the main flow path and configured to control the flow rate of the fluid flowing through the lubrication flow path, a return flow path (for example, a return flow path L7 of the embodiment; the same applies below) connected to the second control valve and configured to return the fluid to the fluid pump, and a sub-flow path (for example, a sub-flow path L8 of the embodiment; the same applies below) branching off from the main flow path, in which the second control valve includes a valve housing chamber (for example, a valve housing chamber 21 of the embodiment; the same applies below) formed in a cylindrical shape, a spool (for example, a spool 22 of the embodiment; the same applies below) slidably housed in the valve housing chamber, a supply port (for example, a supply port 24 of the embodiment; the same applies below) formed on an inner circumferential surface of a central portion of the valve housing chamber and connected to the main flow path, a discharge port (for example, a discharge port 25 of the embodiment; the same applies below) formed in an annular shape at a distance from the supply port of the valve housing chamber and connected to the return flow path, a spring (for example, a coil spring 26 of the embodiment; the same applies below) disposed at one end of the valve housing chamber and configured to bias the spool to the other end, a spool control chamber (for example, a spool control chamber 27 of the embodiment; the same applies below) formed at the other end of the valve housing chamber and configured to make a pressure of a line flow path (for example, a line flow path L9; the same applies below) extending from the lubrication flow path work, an open port (for example, an open port 28 of the embodiment; the same applies below) formed at one end of the valve housing chamber and configured to discharge the fluid, and an annular first recessed portion (for example, a first recessed portion 32 of the embodiment; the same applies below) formed on an outer circumferential surface of the spool and having a width extending from the supply port to the discharge port, in which the spool is moved to one end side of the valve housing chamber against a biasing force of the spring by applying a pressure of the fluid equal to or higher than a predetermined pressure to the spool control chamber, so as to cause the supply port and the discharge port to communicate with each other via the first recessed portion, and a sub port (for example, a sub port 33 of the embodiment; the same applies below) annularly formed between the discharge port and the open port on an inner circumferential surface of the valve housing chamber and connected to the sub-flow path is provided.

Here, in the lubrication loop, since the second control valve is provided via the main flow path, when the flow rate of the fluid in the lubrication loop increases, the second control valve is opened and the fluid in the lubrication loop returns to the fluid pump through the main flow path, the second control valve, and the return flow path. Therefore, the flow rate of the fluid flowing through the lubrication loop can be controlled.

On the other hand, when the supply port and the discharge port communicate with each other via the first recessed portion and the fluid flows therethrough, in a case in which there is no sub-flow path and sub port, air may be drawn from the open port into a gap between the valve housing chamber and the spool and there is a possibility of the air flowing into the return flow path and being mixed into the fluid (lubricating oil). In this respect, since the supply port connected to the main flow path and the sub port connected to the sub-flow path are provided in the second control valve and the annular sub port is disposed between the discharge port connected to the return flow path and the open port, an annular fluid wall is formed in the sub port to block penetration of air from the open port. Therefore, air is not mixed into the fluid of the return flow path and a state of the fluid can be satisfactorily maintained.

[2] Further, in the disclosure, an orifice (for example, an orifice 34 of the embodiment; the same applies below) is formed in the main flow path. Due to the orifice, sudden changes in flow rate in the main flow path can be mitigated and oil vibration can be reduced.

[3] Further, in the disclosure, an annular second recessed portion (for example, a second recessed portion 36 of the embodiment; the same applies below) formed on an outer circumferential surface of the spool and having a width extending from the sub port to the discharge port is provided so that the spool is moved to one end side of the valve housing chamber against a biasing force of the spring by applying a pressure of the fluid equal to or higher than a predetermined pressure to the spool control chamber, so as to cause the sub port and the discharge port to communicate with each other via the second recessed portion. Since the sub port communicates with the discharge port via the second recessed portion, even when a large flow rate of the fluid cannot flow through the main flow path due to the orifice, it is possible to cope with the large flow rate by allowing the fluid to flow also through the sub-flow path.

[4] Further, in the disclosure, the spool is chamfered at an edge of the first recessed portion. By chamfering an edge of the first recessed portion, when the spool moves to cause the supply port and the discharge port to communicate with each other via the first recessed portion, a flow path area gradually changes and thus sudden changes in flow rate can be mitigated.

DESCRIPTION OF THE EMBODIMENTS

Figure 1:
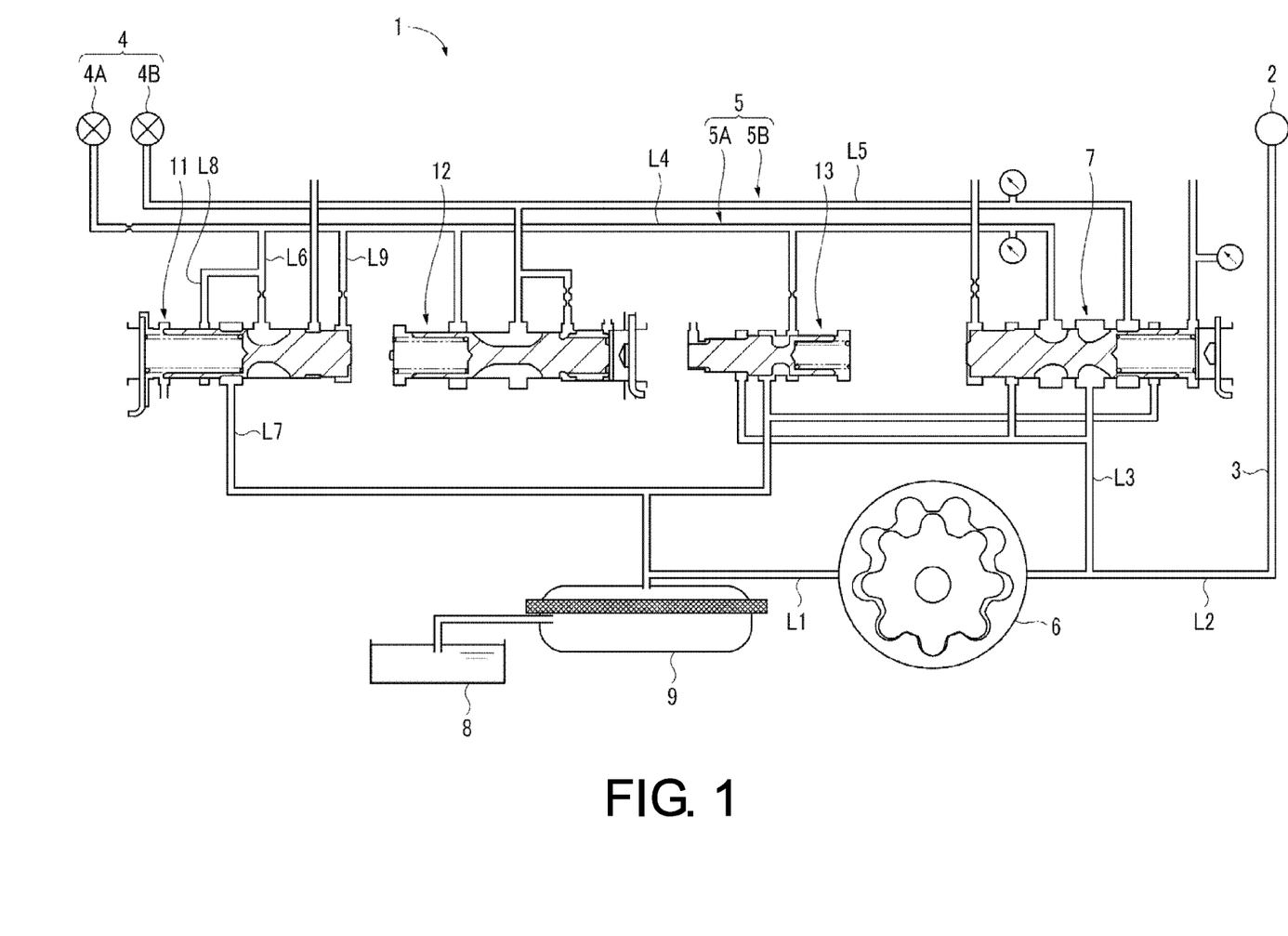
FIG. 1 is an explanatory view schematically illustrating an embodiment of a fluid pressure loop of the disclosure.

A fluid pressure loop of an embodiment of the disclosure will be described with reference to the drawings. As illustrated in FIG. 1, a fluid pressure loop 1 according to the embodiment of the disclosure supplies a fluid (hereinafter referred to as lubricating oil) to a power transmission device mounted on a vehicle (automobile), and includes an operation loop 3 which supplies the lubricating oil to an operating portion 2 such as a friction clutch provided in the power transmission device, a lubrication loop 5 which supplies the lubricating oil to a lubricating portion 4 formed of parts of the operating portion 2 and the like, a fluid pump (hereinafter referred to as a hydraulic pump) 6 which feeds the lubricating oil using power of a driving source ENG (internal combustion engine or electric motor), and a first control valve 7 which controls a fluid pressure of the operation loop 3 by controlling a flow rate of the lubricating oil from the hydraulic pump 6 to the lubrication loop 5.

The lubricating portion 4 is formed of a first lubricating portion 4A including parts such as a friction clutch and a second lubricating portion 4B including a differential gear of the power transmission device and the like. The lubrication loop 5 is formed of a first lubrication loop 5A which introduces the lubricating oil into the friction clutch and the like constituting the first lubricating portion 4A via a main shaft or the like, and a second lubrication loop 5B which supplies the lubricating oil whose temperature has been adjusted by an oil warmer to a differential gear and the like constituting the second lubricating portion 4B.

Also, the fluid pressure loop 1 includes an oil pan 8 which stores the lubricating oil in the fluid pressure loop 1, a strainer 9 which removes foreign matter of the lubricating oil from the oil pan 8, a first flow path L1 which introduces the lubricating oil from the strainer 9 into the hydraulic pump 6, a second flow path L2 which introduces the lubricating oil fed from the hydraulic pump 6 into the operation loop 3, a third flow path L3 branching off from the second flow path L2 and connected to the first control valve 7, a first lubrication flow path L4 which introduces the lubricating oil from the first control valve 7 into the first lubrication loop 5A, and a second lubrication flow path L5 which introduces the lubricating oil from the first control valve 7 into the second lubrication loop 5B.

The hydraulic pump 6 suctions up the lubricating oil stored in the oil pan 8 via the strainer 9 and the first flow path L1 and feeds it to the second flow path L2. The lubricating oil introduced from the second flow path L2 into the third flow path L3 is fed to the first lubrication flow path L4 and the second lubrication flow path L5 when the first control valve 7 opens.

The lubrication loop 5 includes a second control valve 11, a third control valve 12, and a fourth control valve 13. The second control valve 11 releases the lubricating oil in the first lubrication flow path L4 to the first flow path L1 when a pressure of the lubricating oil in the first lubrication flow path L4 is equal to or higher than a predetermined pressure. The third control valve 12 releases the lubricating oil in the second lubrication flow path L5 to the first lubrication flow path L4 when a pressure of the lubricating oil in the second lubrication flow path L5 becomes higher than a difference between the pressure of the lubricating oil in the second lubrication flow path L5 and the pressure of the lubricating oil in the first lubrication flow path L4 by a predetermined pressure or more. The fourth control valve 13 blocks a flow of the lubricating oil from the first lubrication flow path L4 to the first flow path L1 when a pressure of the lubricating oil in the third flow path L3 is equal to or higher than a predetermined pressure.

Figure 2:
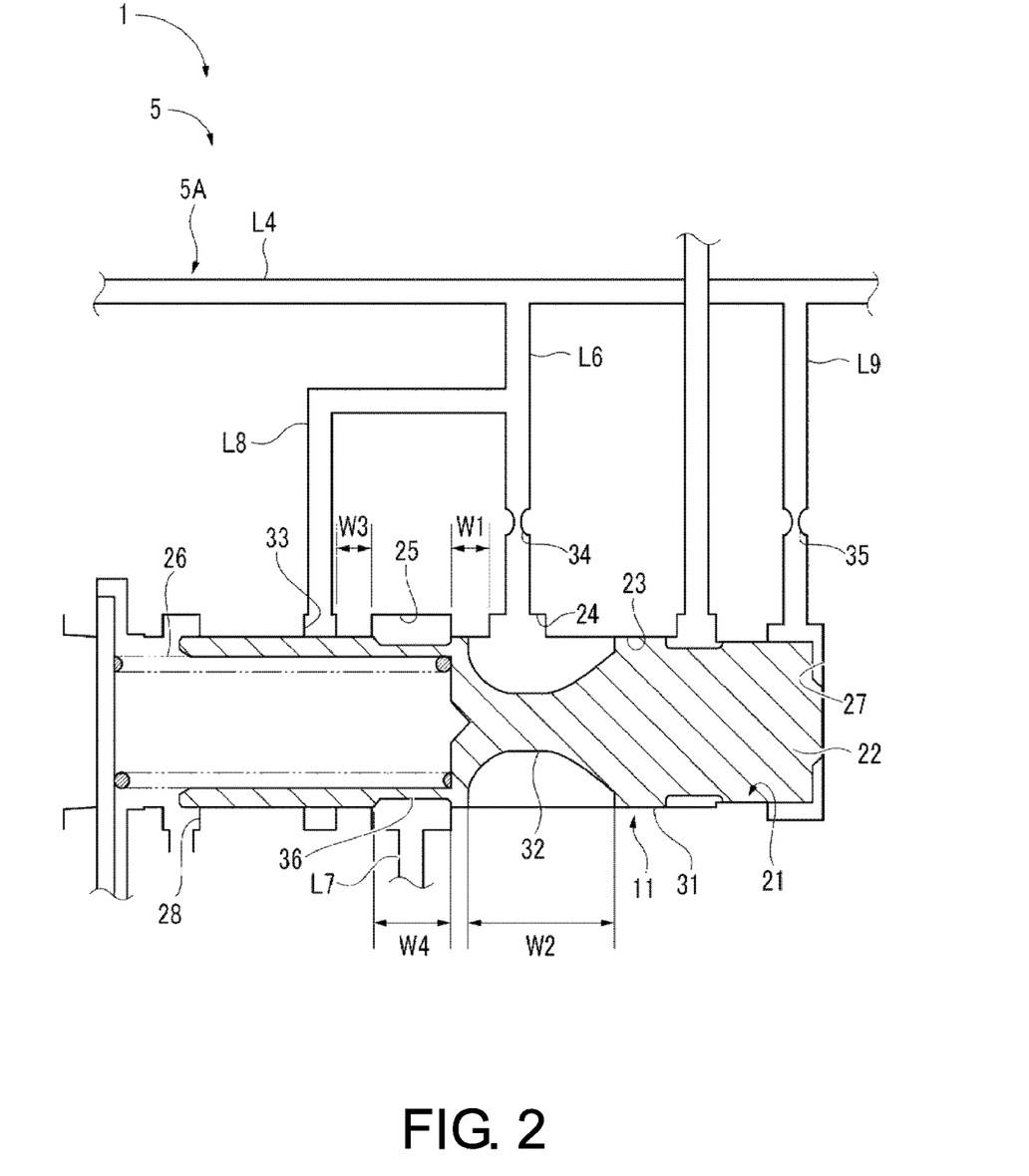
FIG. 2 is an explanatory view illustrating a cross section of a second control valve according to the present embodiment.

FIG. 2 is a cross sectional view illustrating the second control valve 11, and the first lubrication loop 5A includes the first lubrication flow path L4 which introduces the lubricating oil from the first control valve 7 (see FIG. 1), a main flow path L6 connected to the first lubrication flow path L4 and configured to release the lubricating oil, the second control valve 11 connected to the main flow path L6 and configured to control a flow rate of the lubricating oil flowing through the first lubrication flow path L4, a return flow path L7 connected to the second control valve 11 and configured to return the lubricating oil to the hydraulic pump 6 (see FIG. 1) via the first flow path L1 (see FIG. 1), and a sub-flow path L8 branching off from the main flow path L6.

The second control valve 11 includes a valve housing chamber 21 formed in a cylindrical shape, a spool 22 slidably housed in the valve housing chamber 21, a supply port 24 formed on an inner circumferential surface 23 at a center portion of the valve housing chamber 21 and connected to the main flow path L6, a discharge port 25 annularly formed at a distance W1 from the supply port 24 of the valve housing chamber 21 and connected to the return flow path L7, a spring 26 disposed at one end of the valve housing chamber 21 and configured to bias the spool 22 to the other end, a spool control chamber 27 formed at the other end of the valve housing chamber 21 and configured to make a pressure of a line flow path L9 extending from the first lubrication flow path L4 work, an open port 28 formed at one end of the valve housing chamber 21 and configured to discharge the lubricating oil, and an annular first recessed portion 32 formed on an outer circumferential surface 31 of the spool 22 and having a width W2 extending from the supply port 24 to the discharge port 25.

In this configuration, when a pressure of the lubricating oil equal to higher than a predetermined pressure is applied to the spool control chamber 27, the spool 22 moves to one end side of the valve housing chamber 21 against a biasing force of the spring 26 to cause the supply port 24 and the discharge port 25 to communicate with each other via the first recessed portion 32.

Also, the first recessed portion 32 is set such that an inclination angle of a surface at one end side with respect to an axial direction of the spool 22 is larger than that of a surface at the other end side so that a pressure of the lubricating oil supplied to the inside of the first recessed portion 32 acts more strongly on one end side of the valve housing chamber 21 than on the other end side thereof. With this configuration, the spool 22 can be moved to one end side of the valve housing chamber 21 against the biasing force of the spring 26, not only by the spool control chamber 27 but also by the pressure of the lubricating oil supplied to the first recessed portion 32.

One end side of the spool 22 is hollow and formed in a tubular shape, and since this portion formed in a tubular shape serves the role of a spring seat and guides the spring 26, it is possible to direct the biasing force of the spring 26 in the axial direction of the spool 22 to smoothly slide the spool 22.

Also, a sub port 33 annularly formed between the discharge port 25 and the open port 28 on an inner circumferential surface 23 of the valve housing chamber 21, and connected to the sub-flow path L8 is provided.

Further, a first orifice 34 is formed in the main flow path L6, on the supply port 24 side of a branching point of the sub-flow path L8. A second orifice 35 is formed in the line flow path L9. By providing the first orifice 34, sudden changes in flow rate in the main flow path L6 can be mitigated and thus oil vibration can be reduced. Similarly, by providing the second orifice 35, sudden changes in flow rate in the line flow path L9 can be mitigated and thus oil vibration can be reduced.

The discharge port 25 is formed at a distance W3 from the sub port 33. An annular second recessed portion 36 having a width W4 extending from the sub port 33 to the discharge port 25 is formed on the outer circumferential surface 31 of the spool 22. Since the distance W3 is smaller than the width W4, by applying a pressure of the fluid equal to or higher than the predetermined pressure to the spool control chamber 27, the spool 22 moves to one end side of the valve housing chamber 21 against the biasing force of the spring 26, and thereby the sub port 33 and the discharge port 25 communicate with each other via the second recessed portion 36. Since the sub port 33 communicates with the discharge port 25 via the second recessed portion 36, even when a large flow rate of the lubricating oil cannot flow through the main flow path L6 due to the first orifice 34, it is possible to cope with the large flow rate by allowing the lubricating oil to flow also through the sub-flow path L8.

Figure 3:
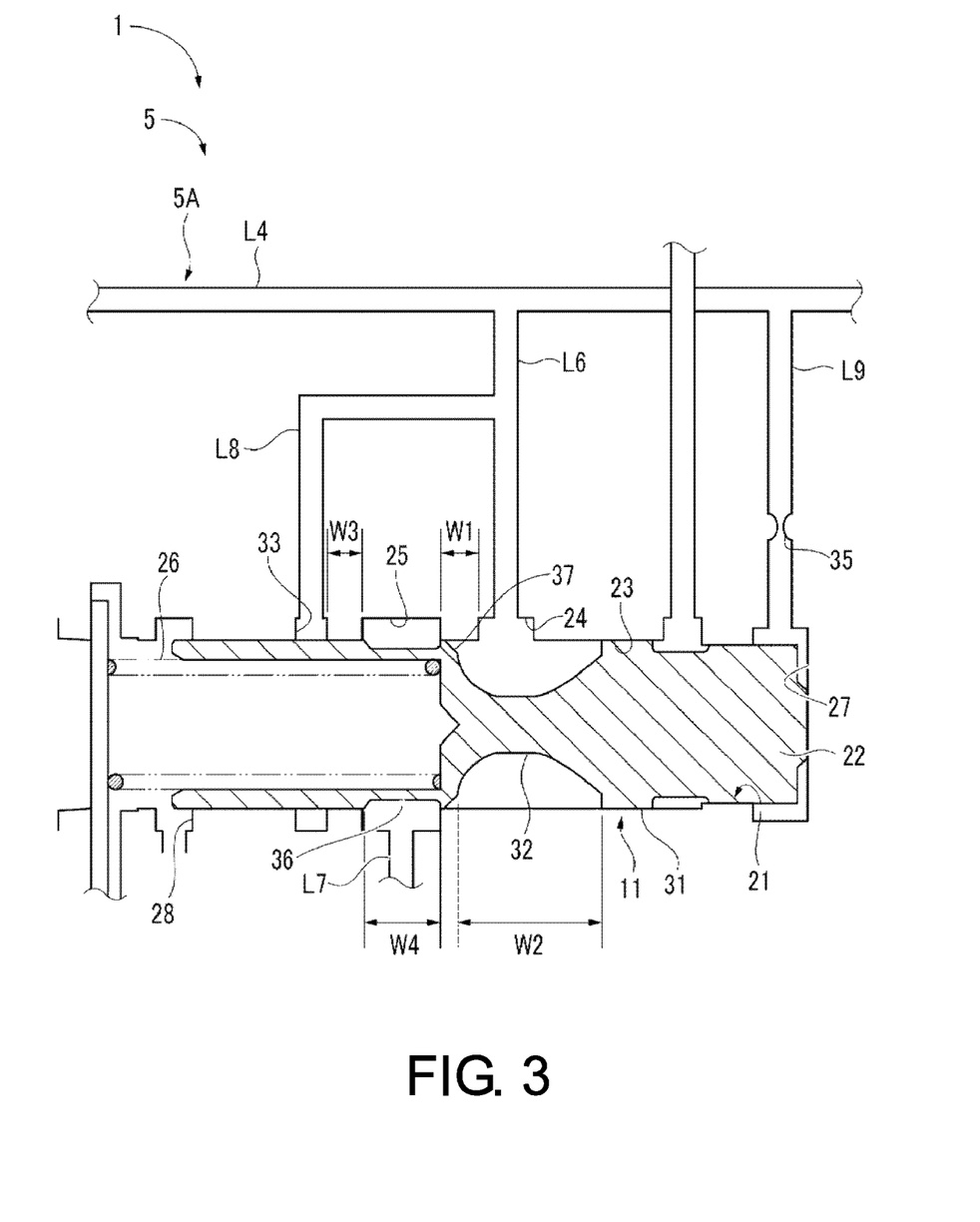
FIG. 3 is an explanatory view illustrating a cross section of a second control valve according to a modified example of the present embodiment.

FIG. 3 is a modified example of the second control valve 11 illustrated in FIG. 2, and description of the same reference signs as those in FIG. 2 will be omitted. In the second control valve 11, an edge of the first recessed portion 32 of the spool 22 is chamfered. Since a chamfered portion 37 is formed at the edge of the first recessed portion 32, when a state in which the supply port 24 and the discharge port 25 communicate with each other via the first recessed portion 32 and a state in which the communication therebetween is blocked are switched by moving the spool 22, a flow path area changes gradually, sudden changes in flow rate can be mitigated, and oil vibration can be reduced. Further, since the oil vibration can be reduced by the chamfered portion 37, the first orifice 34 of the main flow path L6 illustrated in FIG. 2 may not be formed. In other words, according to the second control valve 11 of FIG. 2, since the oil vibration can be reduced by the first orifice 34, the chamfered portion 37 may not be formed. Further, by not forming the chamfered portion 37, it is easy to secure an area for one end side of the first recessed portion 32. Next, an operation of the above-described lubrication loop 5 will be described.

Figure 4A:
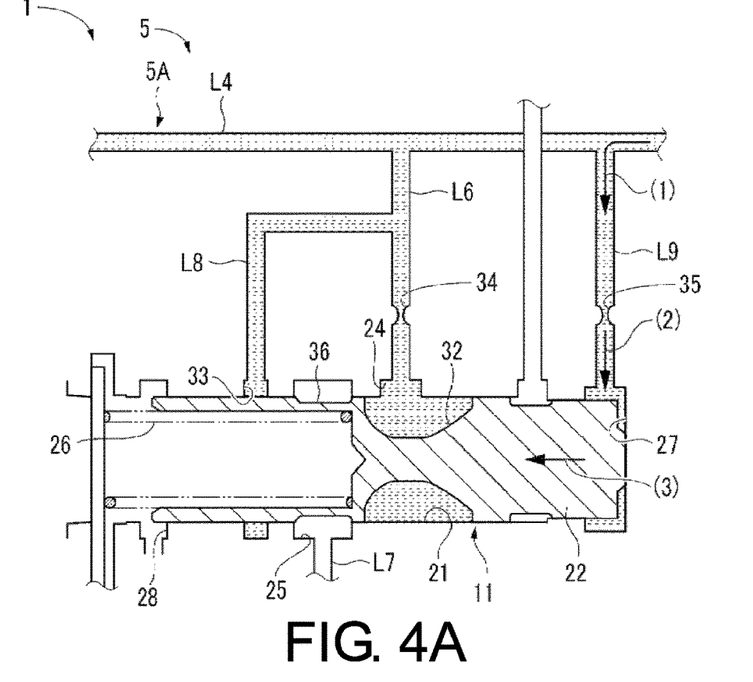
FIGS. 4A and 4B are operation diagrams of a lubrication loop of the present embodiment.

As illustrated in FIG. 4A, the lubricating oil in the first lubrication flow path L4 is introduced into the line flow path L9 (arrow (1)) and is fed to the spool control chamber 27 through the second orifice 35 (arrow (2)). When the lubricating oil having a pressure equal to or higher than the predetermined pressure is applied to the spool control chamber 27, the spool 22 is moved to one end side of the valve housing chamber 21 against the biasing force of the spring 26 (arrow (3)).

Figure 4B:
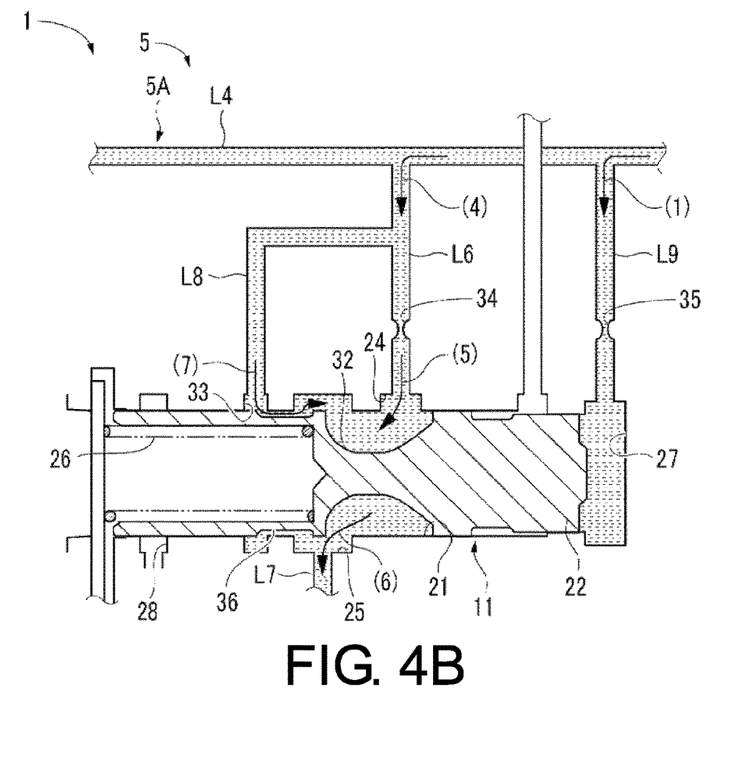

As illustrated in FIG. 4B, the lubricating oil in the first lubrication flow path L4 continues to flow in the line flow path L9 (arrow (1)), and the supply port 24 and the discharge port 25 communicate with each other via the first recessed portion 32. The lubricating oil in the first lubrication flow path L4 is introduced into the main flow path L6 (arrow (4)), enters the first recessed portion 32 from the supply port 24 (arrow (5)), and is discharged from the discharge port 25 to the return flow path L7 (arrow (6)).

On the other hand, the sub port 33 communicates with the discharge port 25 via the second recessed portion 36. Some of the lubricating oil introduced from the first lubrication flow path L4 into the main flow path L6 flows into the sub-flow path L8 and is introduced from the sub port 33 into the discharge port 25 via the second recessed portion 36 (arrow (7)). Since the second control valve 11 is provided in the lubrication loop 5 via the main flow path L6 as described above, when the flow rate of the lubricating oil in the lubrication loop 5 increases, the second control valve 11 is opened and the lubricating oil in the lubrication loop 5 returns to the hydraulic pump 6 (see FIG. 1) through the main flow path L6, the second control valve 11, and the return flow path L7. Accordingly, the flow rate of the lubricating oil flowing through the lubrication loop 5 can be controlled. Next, an operation of a second control valve 111 of a comparative example will be described.

Figure 5:
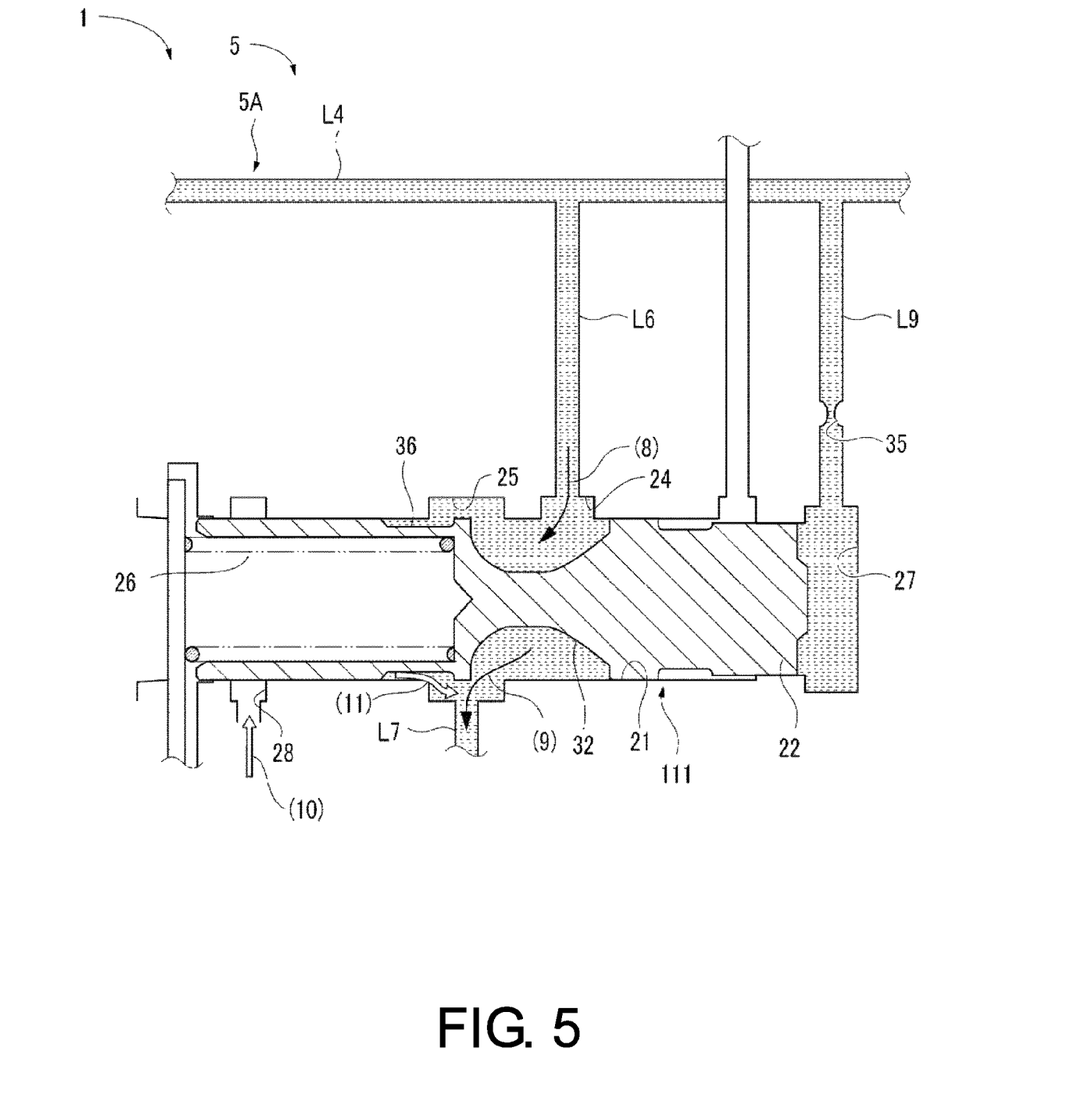
FIG. 5 is an operation diagram of a second control valve of a comparative example.

FIG. 5 illustrates the second control valve 111 of the comparative example, and the sub-flow path L8, the sub port 33, the first orifice 34, and the chamfered portion 37 are not provided in contrast to in the second control valve 11 of the embodiment illustrated in FIG. 2 or FIG. 3. The second control valve 111 of the comparative example is in a state in which the spool 22 is moved to one end of the valve housing chamber 21 against the biasing force of the spring 26, and the supply port 24 and the discharge port 25 communicate with each other via the first recessed portion 32 due to a pressure of the lubricating oil equal to higher than the predetermined pressure being applied to the spool control chamber 27. The lubricating oil in the first lubrication flow path L4 is introduced into the main flow path L6, enters the first recessed portion 32 from the supply port 24 (arrow (8)), and is discharged from the discharge port 25 to the return flow path L7 (arrow (9)).

Here, when the lubricating oil is discharged from the discharge port 25, air may be drawn from the open port 28 into a gap between the valve housing chamber 21 and the spool 22 (arrow (10)), and there is a possibility of the air flowing into the return flow path L7 and being mixed into the lubricating oil (arrow (11)). Since the return flow path L7 on an upstream side of the hydraulic pump 6 is connected to the discharge port 25, the discharge port 25 tends to have a negative pressure. Particularly when the lubricating oil is at a low temperature, viscosity of the lubricating oil is high, the lubricating oil cannot easily enter a gap between the valve housing chamber 21 and the spool 22, and air is easily drawn from the open port 28. This point is ameliorated in this embodiment. Next, an operation of the second control valve 11 of the embodiment will be described.

Figure 6:
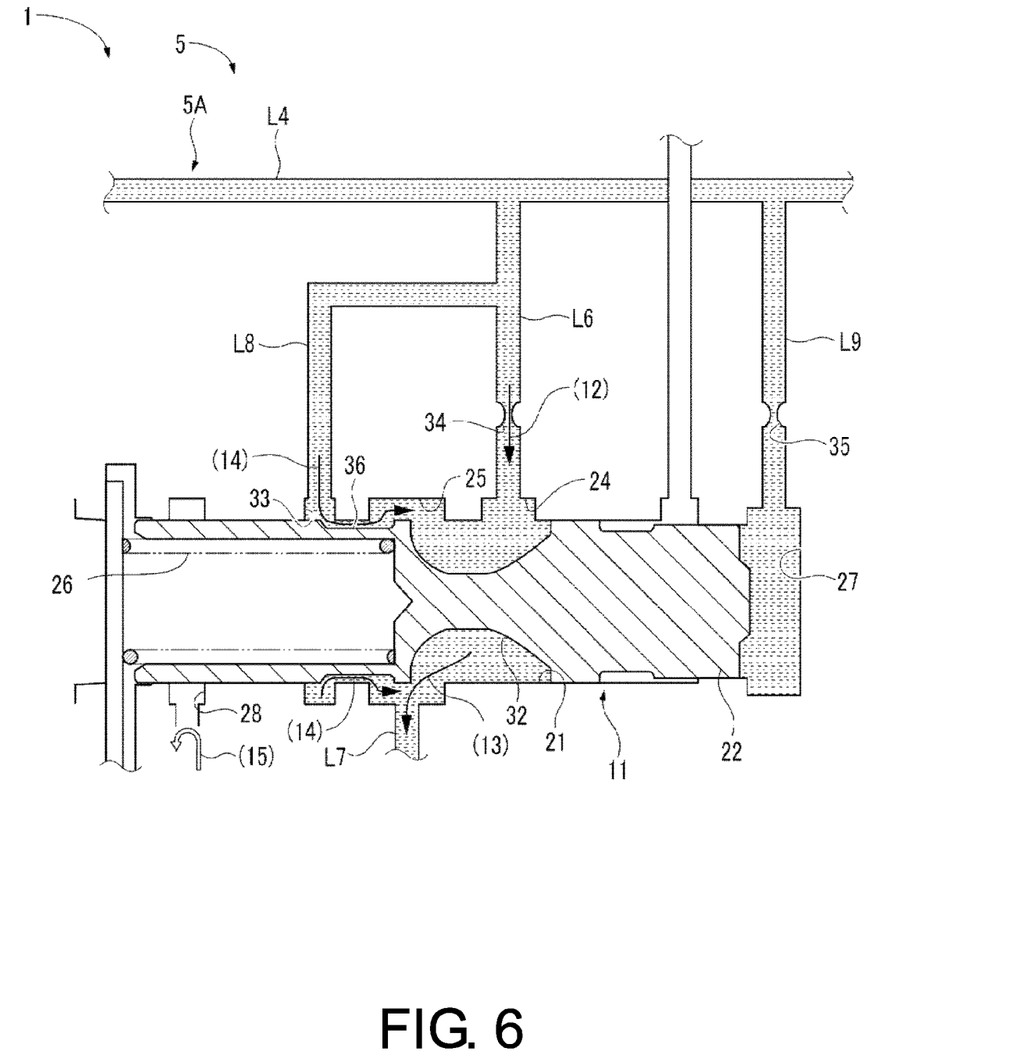
FIG. 6 is an operation diagram of a second control valve according to the present embodiment.

FIG. 6 is the second control valve 11 of the embodiment and shows a state in which the supply port 24 and the discharge port 25 communicate with each other via the first recessed portion 32. The lubricating oil in the first lubrication flow path L4 is introduced into the main flow path L6, passes through the first orifice 34, and enters the supply port 24 (arrow (12)). The lubricating oil is discharged from the first recessed portion 32 via the discharge port 25 to the return flow path L7 (arrow (13)). On the other hand, some of the lubricating oil introduced from the first lubrication flow path L4 into the main flow path L6 flows to the sub-flow path L8 and is introduced from the sub port 33 into the discharge port 25 via the second recessed portion 36 (arrow (14)). At this time, an annular lubricating oil wall is formed in the sub port 33. Therefore, penetration of air from the open port 28 is blocked (arrow (15)).

In this manner, since the supply port 24 connected to the main flow path L6 and the sub port 33 connected to the sub-flow path L8 are provided in the second control valve 11, and the annular sub port 33 is disposed between the discharge port 25 connected to the return flow path L7 and the open port 28, the annular lubricating oil wall is formed in the sub port 33 to block penetration of air from the open port 28. Therefore, air is not mixed into the lubricating oil in the return flow path L7 and a state of the fluid can be satisfactorily maintained even with environmental changes such as a low temperature or high temperature.

In the embodiment, when the first orifice 34 is provided in the main flow path L6, the chamfered portion 37 is not provided in an edge of the first recessed portion 32 of the spool 22, but the disclosure is not limited thereto. The first orifice 34 may be provided in the main flow path L6, and the chamfered portion 37 may be provided in the edge of the first recessed portion 32.

In the present embodiment, description has been made using the friction clutch as the first lubricating portion 4A and the differential gear as the second lubricating portion 4B, but the first lubricating portion and the second lubricating portion of the disclosure are not limited thereto.

What is claimed is:

1. A fluid pressure loop comprising:
an operation loop which supplies a fluid to an operating portion;
a lubrication loop which supplies a fluid to a lubricating portion;
a fluid pump which feeds the fluid; and
a first control valve which controls a fluid pressure of the operation loop by controlling a flow rate of the fluid from the fluid pump to the lubrication loop, wherein
the lubrication loop includes:
a lubrication flow path which introduces the fluid from the first control valve;
a main flow path connected to the lubrication flow path and configured to release the fluid;
a second control valve connected to the main flow path and configured to control the flow rate of the fluid flowing through the lubrication flow path;
a return flow path connected to the second control valve and configured to return the fluid to the fluid pump; and
a sub-flow path branching off from the main flow path, wherein
the second control valve includes:
a valve housing chamber formed in a cylindrical shape;
a spool slidably housed in the valve housing chamber;
a supply port formed on an inner circumferential surface of a central portion of the valve housing chamber and connected to the main flow path;
a discharge port formed in an annular shape at a distance from the supply port of the valve housing chamber and connected to the return flow path;
a spring disposed at one end of the valve housing chamber and configured to bias the spool to the other end;
a spool control chamber formed at the other end of the valve housing chamber and configured to make a pressure of a line flow path extending from the lubrication flow path;
an open port formed at one end of the valve housing chamber and configured to discharge the fluid, and
an annular first recessed portion formed on an outer circumferential surface of the spool and having a width extending from the supply port to the discharge port, wherein
the spool is moved to one end side of the valve housing chamber against a biasing force of the spring by applying a pressure of the fluid equal to or higher than a predetermined pressure to the spool control chamber, so as to cause the supply port and the discharge port to communicate with each other via the first recessed portion, and
a sub port annularly formed between the discharge port and the open port on an inner circumferential surface of the valve housing chamber and connected to the sub-flow path is provided; an annular second recessed portion formed on an outer circumferential surface of the spool and having a width extending from the sub port to the discharge port is provided; the spool is moved to one end side of the valve housing chamber against the biasing force of the spring by applying a pressure of the fluid equal to or higher than a predetermined pressure to the spool control chamber, so as to cause the sub port and the discharge port to communicate with each other via the second recessed portion; and wherein the discharge port is positioned between the supply port and the sub port.

2. The fluid pressure loop according to claim 1, wherein an orifice is formed in the main flow path.

3. The fluid pressure loop according to claim 1, wherein the spool is chamfered at an edge of the first recessed portion.

* * * * *